(12) United States Patent
Yamamoto (10) Patent No.: US 11,420,343 B2
(45) Date of Patent: Aug. 23, 2022

(54) PARALLEL LINK ROBOT

(71) Applicant: FANUC CORPORATION, Yamanashi (JP)

(72) Inventor: Masahiro Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 291 days.

(21) Appl. No.: 16/296,584

(22) Filed: Mar. 8, 2019

(65) Prior Publication Data

US 2019/0329429 A1 Oct. 31, 2019

(30) Foreign Application Priority Data

Apr. 27, 2018 (JP) .............................. JP2018-087176

(51) Int. Cl.
*B25J 19/00* (2006.01)
*B25J 9/00* (2006.01)
*B25J 9/16* (2006.01)
*B25J 18/00* (2006.01)

(52) U.S. Cl.
CPC ......... *B25J 19/0062* (2013.01); *B25J 9/0051* (2013.01); *B25J 9/1623* (2013.01); *B25J 19/0066* (2013.01); *B25J 18/00* (2013.01)

(58) Field of Classification Search
CPC .. B25J 19/0062; B25J 9/0051; B25J 19/0066; B25J 9/1623; B25J 18/00; B25J 9/003; B25J 19/00
USPC ............................................ 74/490.01–490.6
See application file for complete search history.

(56) References Cited

U.S. PATENT DOCUMENTS

| | | |
|---|---|---|
| 2010/0154579 A1 | 6/2010 | Nakamura |
| 2013/0017050 A1 | 1/2013 | Fukudome et al. |
| 2014/0060230 A1 | 3/2014 | Nagayama |
| 2014/0274515 A1* | 9/2014 | Takahashi .............. B60K 17/00 474/150 |
| 2015/0088308 A1 | 3/2015 | Isobe et al. |

FOREIGN PATENT DOCUMENTS

| | | |
|---|---|---|
| EP | 2 546 032 A2 | 1/2013 |
| EP | 3 281 753 A1 | 2/2018 |
| JP | S61-022164 A | 1/1986 |
| JP | H04-97233 U | 8/1992 |
| JP | H09-225868 A | 9/1997 |
| JP | H09-234638 A | 9/1997 |
| JP | H11-123217 A | 5/1999 |
| JP | 2003-117766 A | 4/2003 |
| JP | 2003-226405 A | 8/2003 |

(Continued)

OTHER PUBLICATIONS

CN-108555966-A, Sep. 2018, Li Dongsheng (Year: 2018).*

(Continued)

*Primary Examiner* — Victor L MacArthur
(74) *Attorney, Agent, or Firm* — Maier & Maier, PLLC (57) ABSTRACT

A parallel link robot includes a main body, a number of driving mechanisms provided in the main body, a number of link units each having one end connected to corresponding one of the plurality of driving mechanisms, a movable plate disposed beneath the main body, and supported by the other ends of the number of link units, and an oil tray placed adjacently to the lower surface of the main body, where the oil tray is detachably attached to the main body.

9 Claims, 9 Drawing Sheets

(56) References Cited

FOREIGN PATENT DOCUMENTS

| | | | |
|---|---|---|---|
| JP | 2005349483 A | * | 12/2005 |
| JP | 2008-202820 A | | 9/2008 |
| JP | 2008-281061 A | | 11/2008 |
| JP | 2009-255194 A | | 11/2009 |
| JP | 2009-291878 A | | 12/2009 |
| JP | 2011-056661 A | | 3/2011 |
| JP | 2011-200989 A | | 10/2011 |
| JP | 2011-245586 A | | 12/2011 |
| JP | 2013-022652 A | | 2/2013 |
| JP | 2014-005926 A | | 1/2014 |
| JP | 2014-046399 A | | 3/2014 |
| KR | 10-2013-0100476 A | | 9/2013 |
| WO | 2007/080988 A1 | | 7/2007 |

OTHER PUBLICATIONS

CN-206344173-U, Jul. 2017, Zhang Yongfeng (Year: 2017).*

Japanese Office Action dated Jun. 16, 2020, in connection with corresponding JP Application No. 2018-087176 (11 pp., including machine-generated English translation).

Japanese Search Report dated May 20, 2020, in connection with corresponding JP Application No. 2018-087176 (24 pp., including machine-generated English translation).

Japanese Office Action dated Sep. 15, 2020, in connection with corresponding JP Application No. 2018-087176 (13 pp., including machine-generated English translation).

* cited by examiner

PARALLEL LINK ROBOT

CROSS-REFERENCE TO RELATED APPLICATIONS

This application is based on and claims priority to Japanese Patent Application No. 2018-087176 filed on Apr. 27, 2018, the entire content of which is incorporated herein by reference.

FIELD

The present invention relates to a parallel link robot.

BACKGROUND

There is known a parallel link robot having a base member, a plurality of motor housings fixed to the base member, and a plurality of link units respectively fixed to output shafts extending from ends of the plurality of motor housings, wherein a ring-shaped member is fixed to each of the ends of the motor housings, and an oil reservoir is provided on an inner periphery surface of the ring (cf. Japanese Unexamined Patent Application, Publication No. 2009-255194).

SUMMARY

A parallel link robot according to a first aspect of the present invention includes: a main body; a plurality of driving mechanisms provided in the main body; a plurality of link units each having one end connected to corresponding one of the plurality of driving mechanisms; a movable plate disposed beneath the main body, and supported by the other ends of the plurality of link units; and an oil tray placed adjacently to a lower surface of the main body, wherein the oil tray is detachably attached to the main body.

A parallel link robot according to a second aspect of the present invention includes: a main body; a plurality of driving mechanisms provided in the main body; a plurality of link units each having one end connected to corresponding one of the plurality of driving mechanisms; a movable plate disposed beneath the main body, and supported by the other ends of the plurality of link units; and an oil tray attached adjacent to a lower surface of the main body, wherein the oil tray includes a bottom plate, a wall extending upwardly from one end of the bottom plate in a predetermined direction, and an opening area at the other end of the oil tray in the predetermined direction, the opening area does not have a wall extending upwardly from the bottom plate.

DETAILED DESCRIPTION

Hereinafter, a parallel link robot according to an embodiment of the present invention will be described with reference to the drawings.

Figure 1:
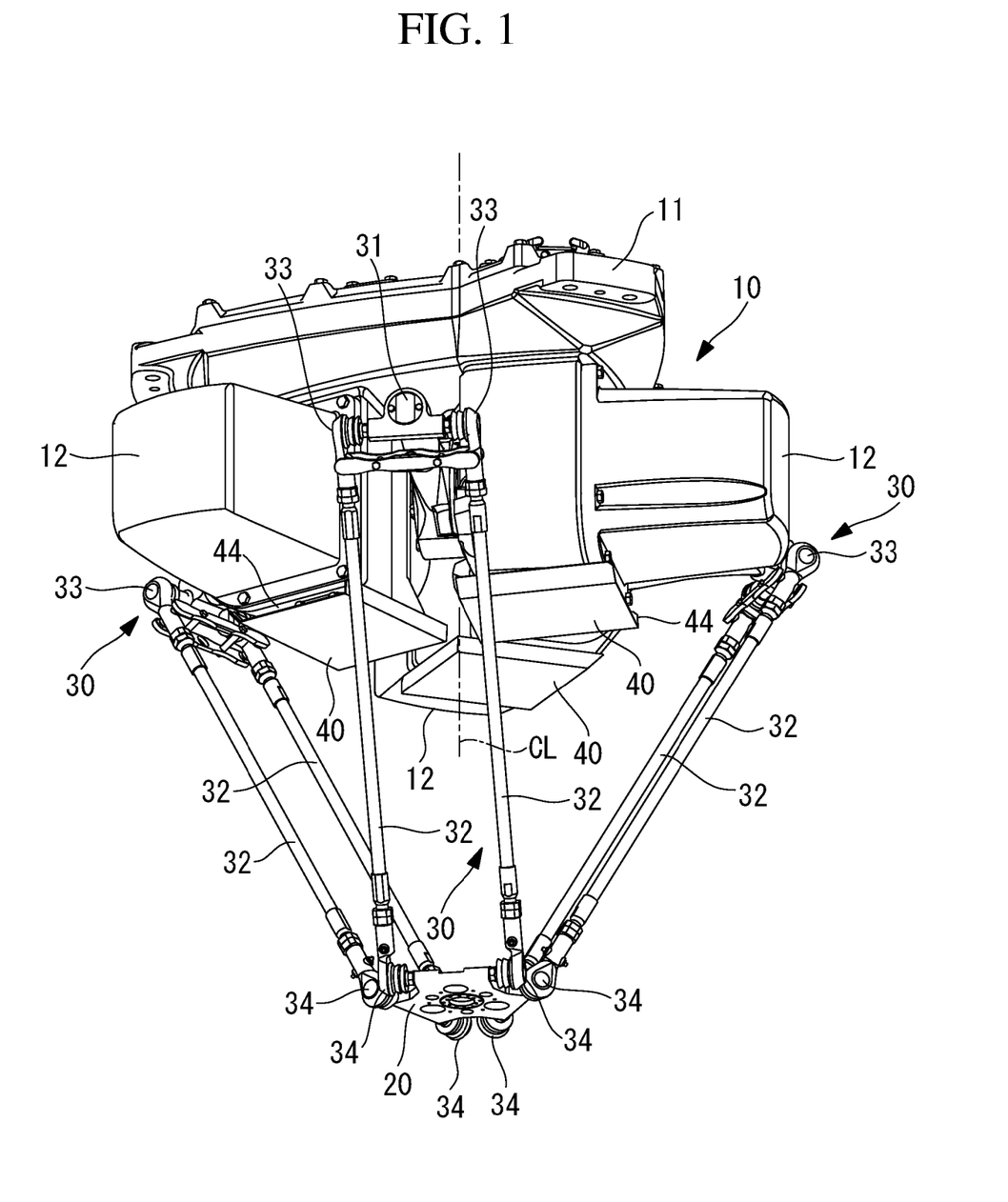
FIG. 1 is a perspective view of a parallel link robot according to an embodiment of the present invention.

The parallel link robot according to this embodiment includes, as illustrated in FIG. 1, a main body 10, a movable plate 20 disposed beneath the main body 10, and three link units 30 that connect the main body 10 and the movable plate 20.

Figure 2:
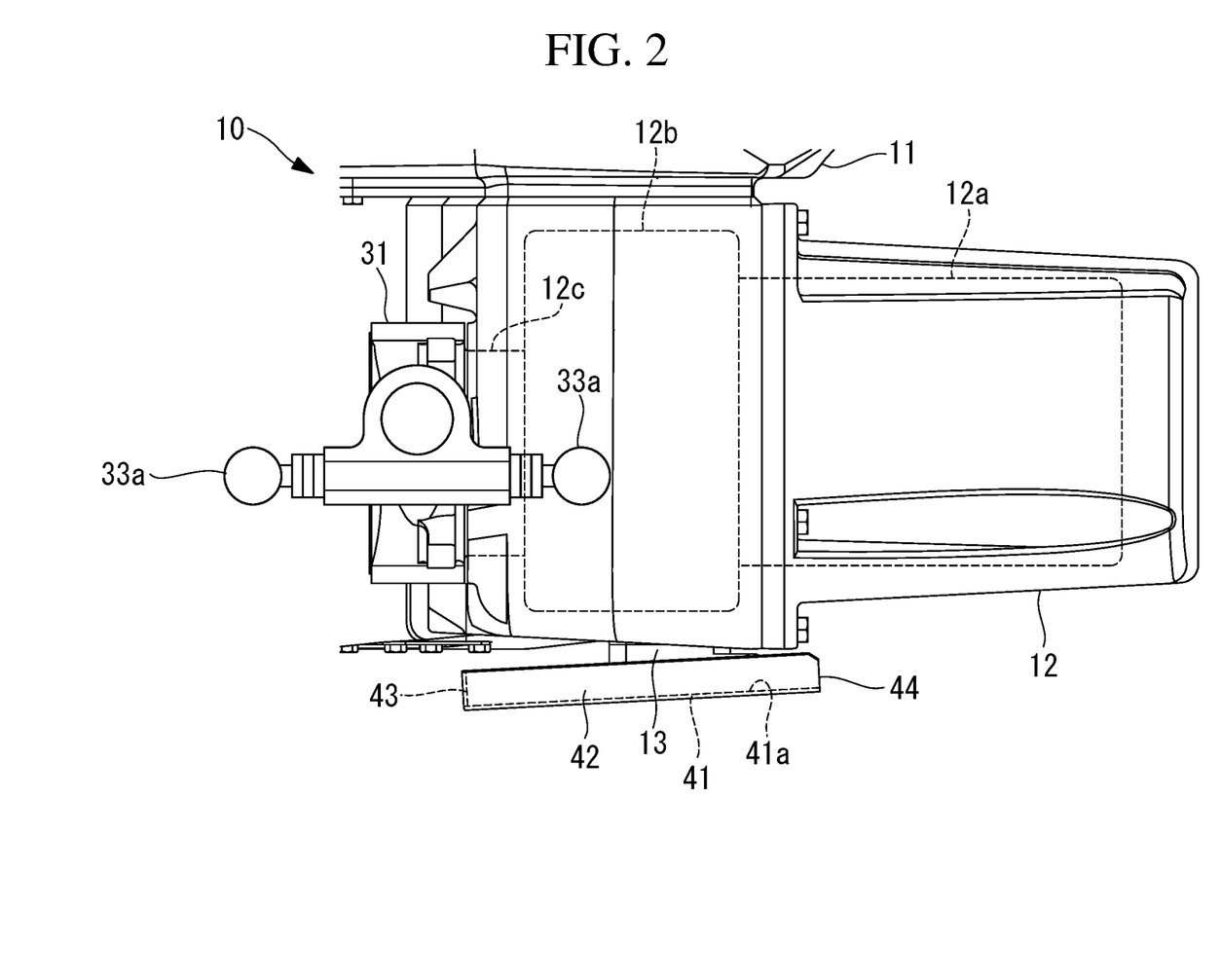
FIG. 2 is a front view of a main part of the parallel link robot according to this embodiment.

The main body 10 includes, as illustrated in FIG. 1, a base member 11 that lies substantially horizontally, and three motor housings 12 that are fixed to a lower surface of the base member 11. As illustrated in FIG. 2, each of the motor housings 12 contains a servomotor 12a and a reducer 12b coupled to an output shaft of the servomotor 12a. The servomotor 12a and the reducer 12b serve as a driving mechanism.

The three motor housings 12 are disposed at regular intervals about a central axis line CL of the main body 10 that passes vertically through the main body 10.

Figure 3:
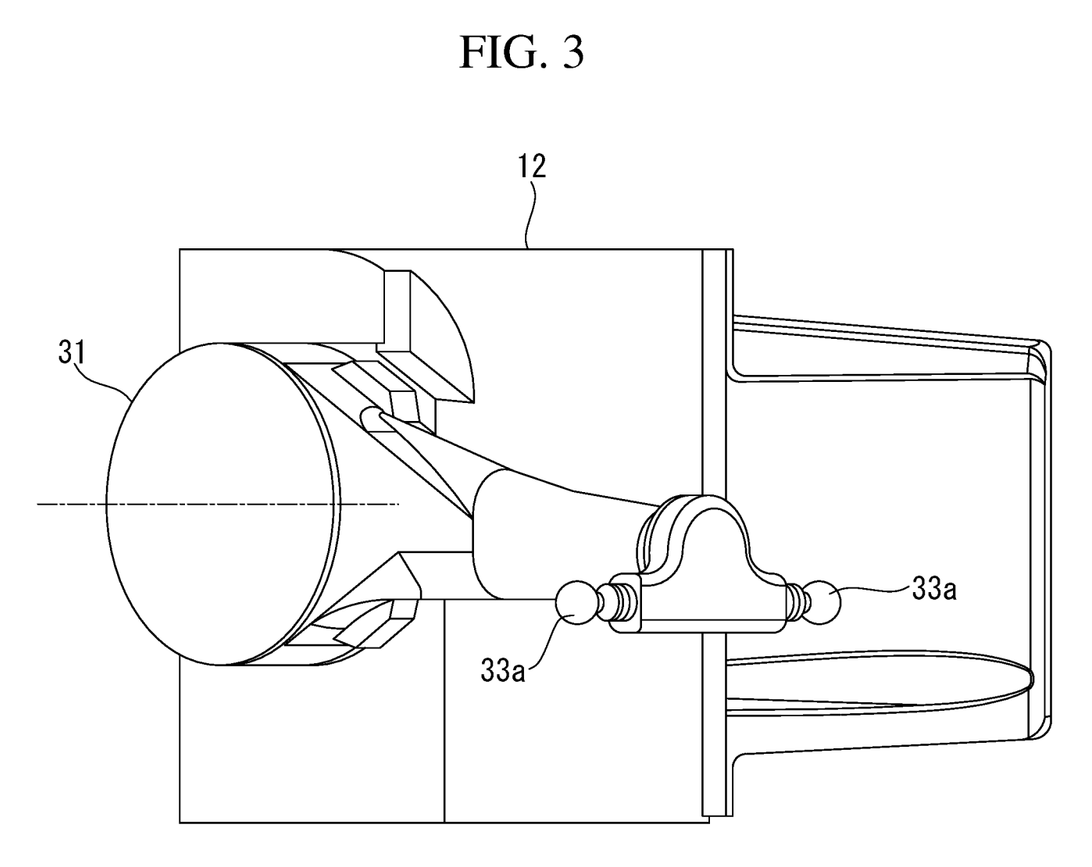
FIG. 3 is a perspective view of a motor housing and a drive link of the parallel link robot according to this embodiment.

As illustrated in FIG. 1, each of the link units 30 includes a drive link 31 having one end fixed to an output shaft 12c of the reducer 12b, and a pair of driven links 32 each having one end connected to the other end of the drive link 31. As illustrated in FIG. 2 and FIG. 3, two spherical coupling portions 33a are provided at the other end of the drive link 31. The spherical coupling portions 33a are members to which the one ends of the driven links 32 are coupled, respectively. The other end of the drive link 31 and the one ends of the driven links are coupled via respective spherical bearings 33, and each of the spherical coupling portions 33a is a part of the corresponding spherical bearing 33.

The other ends of the driven links 32 are coupled to the movable plate 20 via respective spherical bearings 34. Here, the spherical bearings 33 and 34 may be ball joints.

The movable plate 20 is provided with an orientation change unit that is not shown, and an end effector such as a hand for holding an object is attached to the orientation change unit.

For example, the base member 11 of the main body 10 is supported by a frame that is not shown, and thus the parallel link robot is positioned above a conveyor. The end effector attached to the parallel link robot performs a predetermined operation to an object on the conveyor.

The servomotors 12a are controlled by a robot controller that is not shown. The robot controller includes a control unit having a processor, a storage unit such as a hard disk, and an teach panel. The storage unit stores an operation program, and the robot controller drives the servomotor 12a based on the operation program. With this, movement of the movable plate 20 is controlled based on the operation program, for the work to the object on the conveyor.

Figure 4:
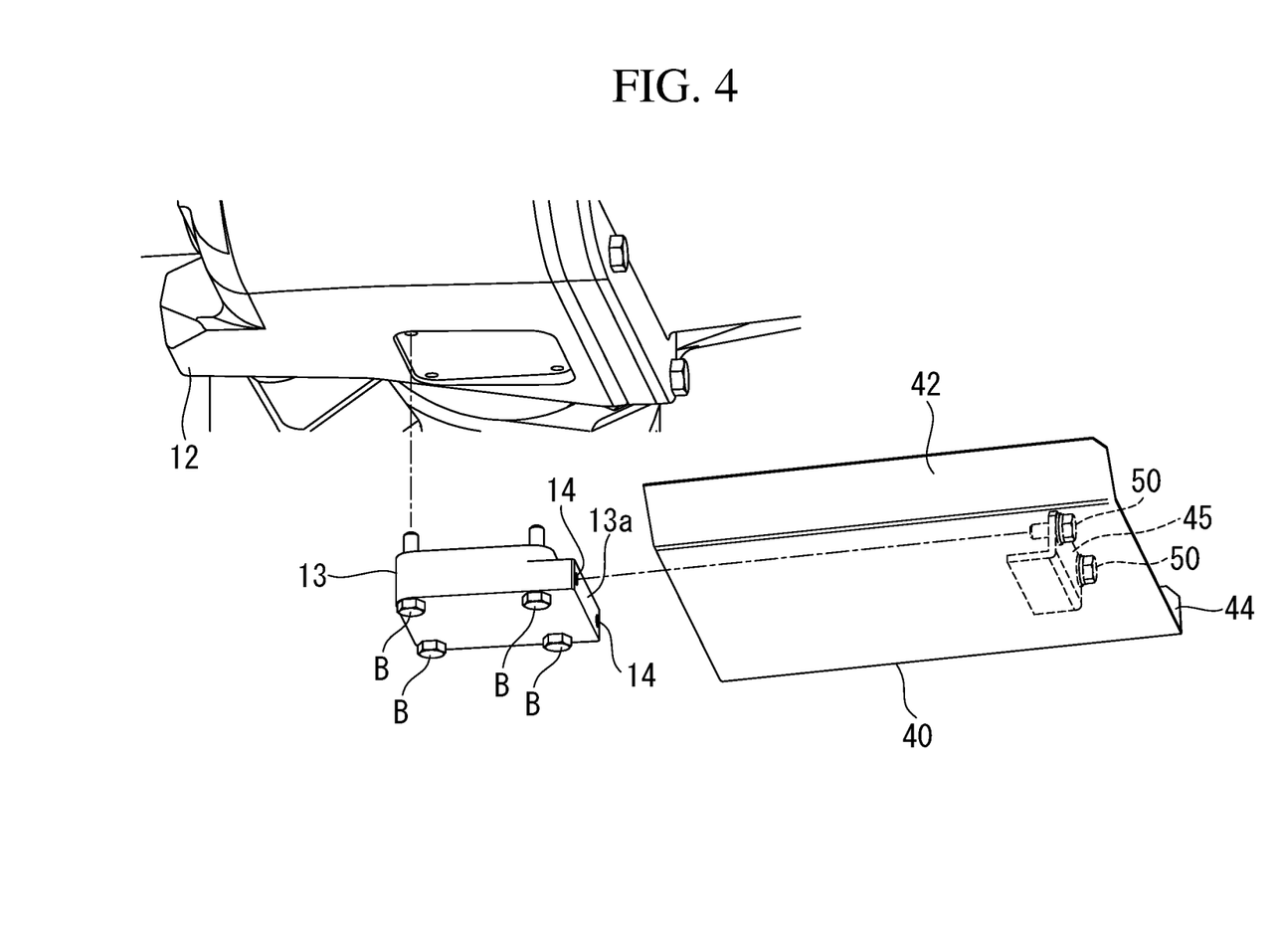
FIG. 4 is a view illustrating how an oil tray is attached to the parallel link robot according to this embodiment.

As illustrated in FIG. 1, three oil trays 40 are disposed in the neighborhood of a lower surface of the main body 10. As illustrated in FIG. 2 and FIG. 4, attachment blocks 13 are respectively fixed to lower surface portions of the motor housings 12 of the main body 10, and the three oil trays 40 are respectively attached to the attachment blocks 13. In other words, each of the oil trays 40 is disposed beneath the corresponding motor housing 12.

Each of the attachment blocks 13 is fixed to the lower surface portion of the motor housing 12 via a plurality of fixation bolts B, and a central axis line of the fixation bolts B at this time extends vertically.

Figure 5:
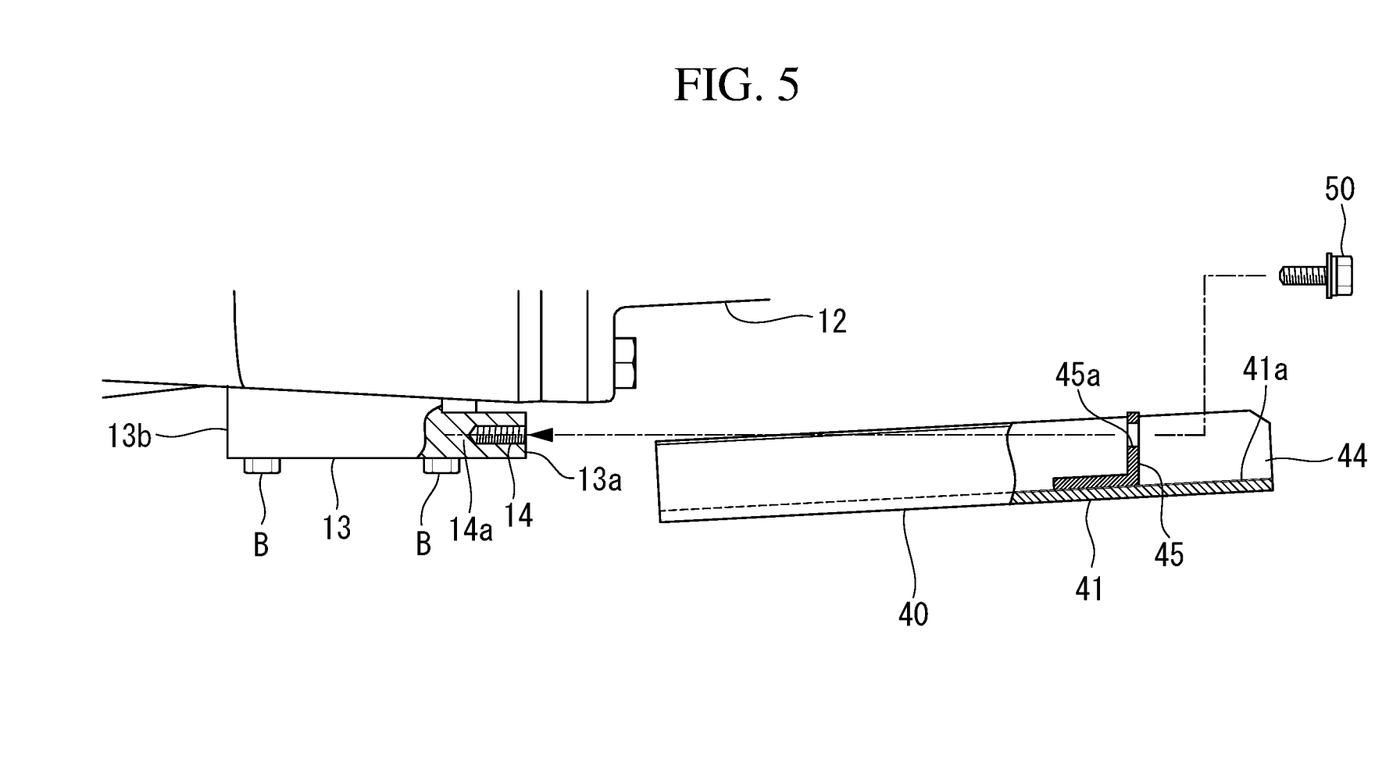
FIG. 5 is a view illustrating how the oil tray is attached to the parallel link robot according to this embodiment.

An attachment surface 13a of the attachment block 13 that faces a horizontal direction is provided with screw holes 14 through each of which a installation bolt 50 for attachment of the oil tray 40 is screwed. As illustrated in FIG. 5, a central axis line 14a of the screw holes 14 extends substantially horizontally. Therefore, even if the installation bolts 50 are loosened, the installation bolts 50 may not easily fall out of the screw holes 14 as compared to a case in which the central axis line 14a extends vertically.

Here, in this embodiment, when an angle between the central axis line 14a and a horizontal plane is 30 degrees or smaller, and when the above effect can be obtained, the central axis line 14a is extending substantially horizontally. Even when the angle between the central axis line 14a and the horizontal plane is large, the above effect can be obtained if the central axis line 14a is inclined downward to the inner part from an opening of the screw hole 14.

A surface 13b of the attachment block 13 that is on an opposite side of the attachment surface 13a also faces horizontally. The surface 13b faces inwardly to a center side of the main body 10, and the attachment surface 13a faces toward an outside of the main body 10. In other words, the screw holes 14 provided in the attachment surface 13a facing toward the outside of the main body 10 are used for attachment of the oil tray 40.

Figure 6:
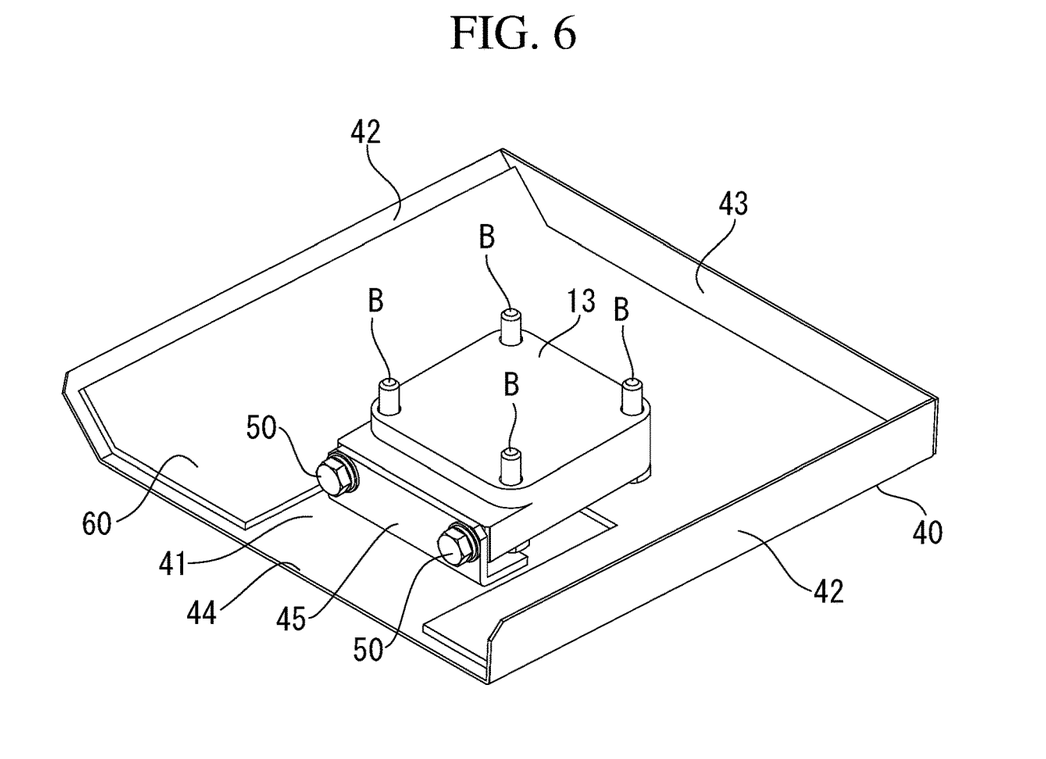
FIG. 6 is a perspective view of the oil tray of the parallel link robot according to this embodiment.

As illustrated in FIG. 6, the oil tray 40 includes a bottom plate 41 and a pair of side walls 42 that respectively extend upwardly from the both ends of the bottom plate 41 in a width direction. One of the pair of side walls 42 extends obliquely upward, and an upper end of this one side wall is more distant from the other of the side walls 42 than the lower end of the one side wall is. The pair of side walls 42 are substantially parallel with the central axis line CL of the output shaft 12c of the reducer 12b. In other words, the width direction of the bottom plate 41 is orthogonal to a direction along the central axis line CL.

The oil tray 40 includes a back wall 43 that extends upwardly from one end of the bottom plate 41 in a direction orthogonal to the width direction, and the oil tray 40 contains oil, grease, and the like in a space enclosed by the back wall 43 and the pair of side walls 42. Oil, grease, and the like drips from the motor housing 12, the output shaft 12c, the drive link 31, and the like. In this embodiment, the direction orthogonal to the width direction is referred to as a predetermined direction.

At the other end of the bottom plate 41 in the predetermined direction, there is no wall extending upwardly from the bottom plate 41. Specifically, at the other end of the bottom plate 41 of the oil tray 40 in the predetermined direction, an opening area 44 is provided. In other words, the opening area 44 is provided at a position of the bottom plate 41 facing toward an outside of the main body 10.

The oil tray 40 is provided with an attachment portion 45 extending upwardly from the bottom plate 41 at a middle position in the predetermined direction. The attachment portion 45 is fixed to the bottom plate 41, and attachment holes 45a are provided in the attachment portion 45. The attachment holes 45a penetrate through the attachment portion 45 in the predetermined direction.

By placing the oil tray 40 beneath the corresponding motor housing 12, and by fastening the installation bolts 50 inserted through the attachment holes 45a of the attachment portion 45 into the screw holes 14 of the attachment block 13, the oil tray 40 is attached to the main body 10. On the other hand, by removing the installation bolts 50 from the screw holes 14, the oil tray 40 can be removed from the main body 10.

As illustrated in FIG. 6, an oil absorbent sheet 60 is placed on the bottom plate 41 of the oil tray 40. The oil absorbent sheet 60 is made of paper, non-woven cloth, woven cloth, foamed plastic, or the like. As the oil absorbent sheet 60, a known oil absorbing material in a sheet shape may be used. In this embodiment, the oil absorbent sheet 60 is attached on the bottom plate 41 by a double-faced tape or the like.

The bottom plate 41, the side wall 42, or the back wall 43 may be provided with a springy clip member (not shown) which can be deformed. In this case, the clip member deformed within the springy range is brought into contact with the oil absorbent sheet 60 from above, and the oil absorbent sheet 60 is attached to the bottom plate 41 due to a reactive force against the springy deformation.

Further, in this embodiment, as illustrated in FIG. 2, an upper surface 41a of the bottom plate 41 is inclined upwardly from one end to the other end in the predetermined direction.

As described above, in this embodiment, the oil tray 40 is disposed in the neighborhood of the lower surface of the main body 10, and the oil tray 40 is detachably attached to the main body 10. Therefore, the oil tray 40 may be removed when inspection, cleaning, and other types of maintenance of the main body 10 are carried out.

In a case in which the parallel link robot handles delicate products such as food, medicinal products, and cosmetics, inspection, cleaning, and other types of maintenance of the main body 10 largely influences quality maintenance, reliability of quality, and the like of these products. As the oil tray 40 is removable, it is possible to easily and reliably perform inspection, cleaning, and other types of maintenance of the main body 10, in particular, the lower surface portion of the main body 10. This is advantageous in order to improve reliability and the like of quality of products that the parallel link robot handles.

Further, in this embodiment, the oil absorbent sheet 60 that covers a part of the bottom plate 41 of the oil tray 40 is further provided. Therefore, oil, grease, and the like may not easily drip from the oil tray 40, as compared to a case in which the oil absorbent sheet 60 is not provided. For example, if the oil tray 40 is inclined when removing the oil tray 40 from the main body 10, oil, grease, and the like may not easily drip from the oil tray 40 as compared to the case in which the oil absorbent sheet 60 is not provided. This is advantageous in order to improve reliability and the like of quality of products that the parallel link robot handles.

Further, using the oil absorbent sheet 60 that changes its color when oil, grease, and the like are absorbed, it is possible to easily confirm an amount of the oil, grease, and the like in the oil tray 40.

Moreover, in this embodiment, the main body 10 is provided with the screw holes 14 that extend substantially horizontal, and the oil tray 40 is detachably attached to the main body 10 via the installation bolts 50 fastened to the screw holes 14. In a case in which the installation bolts 50 are inserted, for example, into screw holes extending vertically, the installation bolts 50 may drop easily during fastening or removal of the installation bolts 50.

In the case in which the parallel link robot handles delicate products such as food, medicinal products, contamination and damages of the conveyor and the like due to dropping of the installation bolts 50 often considered to be undesirable. By contrast, the installation bolts 50 inserted into the screw holes 14 that extend substantially horizontally may not drop easily during fastening or removal of the installation bolts 50.

Furthermore, as the screw holes 14 extend substantially horizontally, the installation bolts 50 may not drop easily even if the installation bolts 50 are loosened, as compared to the case in which the screw holes 14 extend vertically.

Further, in this embodiment, the main body 10 includes the attachment block 13 fixed to the lower surface portion of the main body 10. The fixation bolts B that fix the attachment block 13 to the lower surface of the main body 10 extend vertically, and the attachment block 13 is provided with the screw holes 14 that extend substantially horizontally. The oil tray 40 is detachably attached to the main body 10 via the installation bolts 50 fastened to the screw holes 14, and the oil tray 40 is positioned under the fixation bolts B.

As described above, as the oil tray 40 is positioned under the fixation bolts B, even if any of the fixation bolts B is loosened and dropped, the dropped fixation bolt B is received by the oil tray 40. This configuration is advantageous in order to improve reliability of quality of products that the parallel link robot handles.

Further, in this embodiment, the oil tray 40 includes the bottom plate 41, the back wall 43 that extends upwardly from the one end of the bottom plate 41 in the predetermined direction, and the pair of side walls 42 that extend upwardly from respective both ends of the bottom plate 41 in the direction orthogonal to the predetermined direction. Moreover, at the other end of the bottom plate 41 in the predetermined direction, the opening area 44 having no wall extending upwardly from the bottom plate 41 is provided. The oil tray 40 is further provided with the attachment portion 45 extending upwardly from the bottom plate 41 at the position middle of the predetermined direction, and fixed to the main body 10 via the installation bolts 50. The attachment portion 45 is provided with the attachment holes 45a through which the installation bolts 50 are respectively inserted in the predetermined direction.

Figure 7:
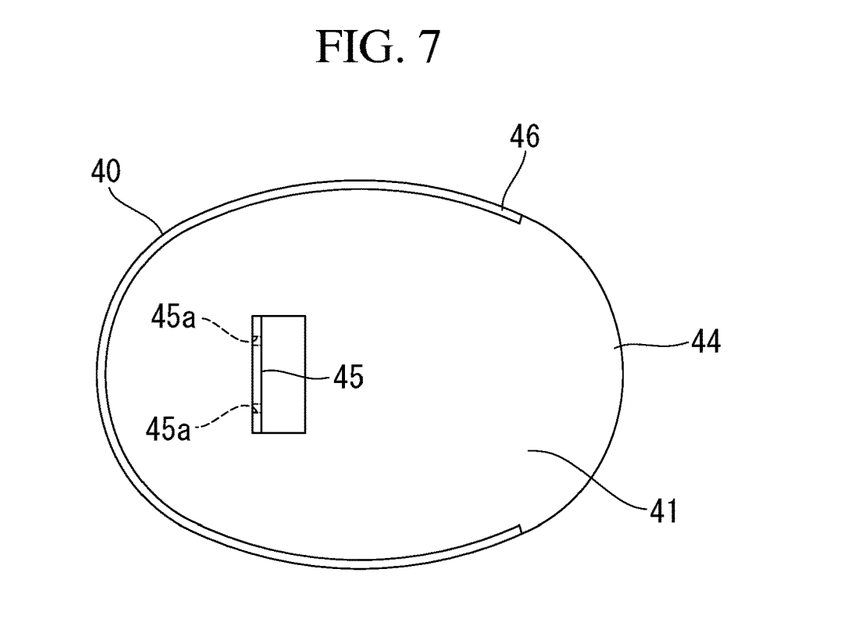
FIG. 7 is a plan view of an oil tray of a first modified example of the parallel link robot according to this embodiment.
Figure 8:
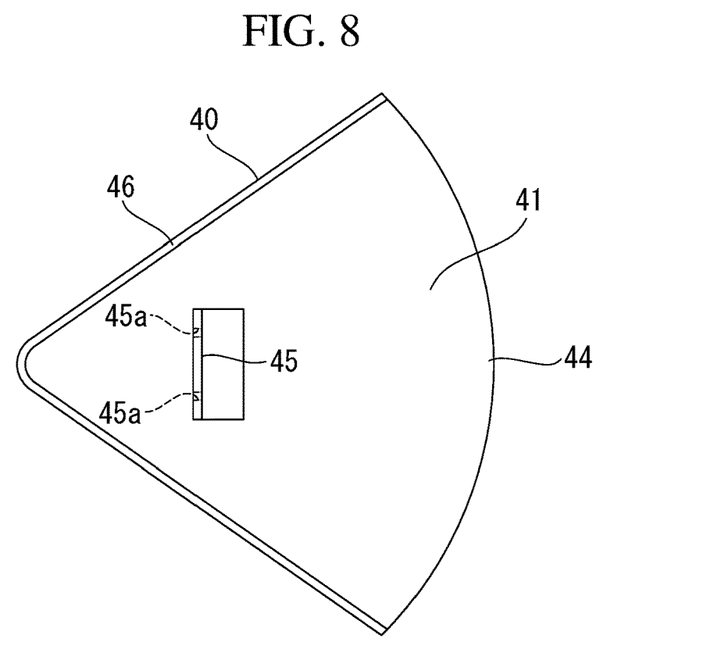
FIG. 8 is a plan view of an oil tray of a second modified example of the parallel link robot according to this embodiment.
Figure 9:
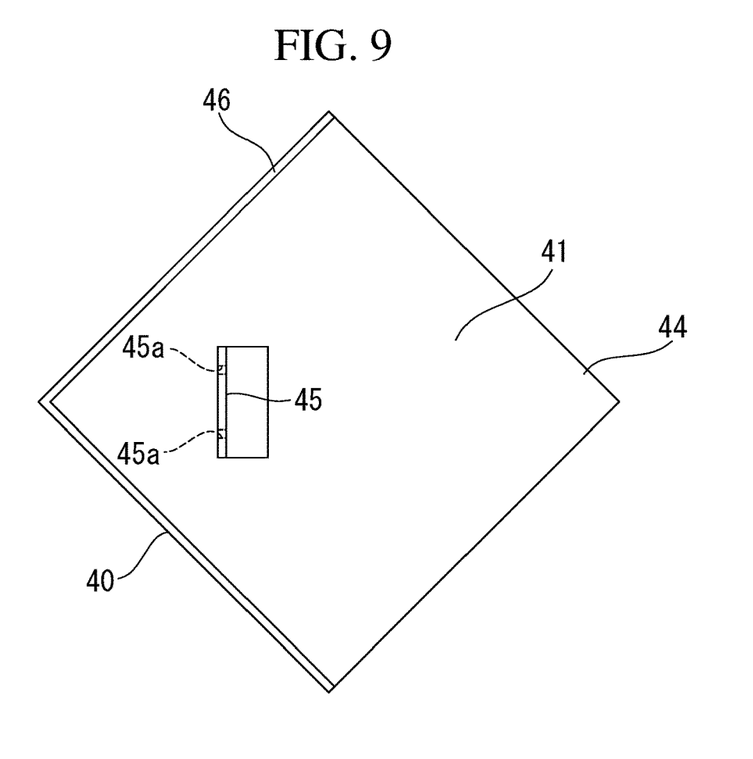
FIG. 9 is a plan view of an oil tray of a third modified example of the parallel link robot according to this embodiment.

Here, in different examples, as illustrated in FIG. 7 through FIG. 9, the oil tray 40 includes the bottom plate 41, and a wall extending upwardly from a periphery portion of the bottom plate 41, and a part of a periphery portion of the bottom plate portion 41 of the oil tray 40 is provided with the opening area 44 for which a wall 46 extending upwardly from the periphery portion of the bottom plate 41 is not provided. In other words, the wall 46 is provided on a side of the one end of the bottom plate 41 in the predetermined direction, and the opening area 44 is provided on a side of the other end of the bottom plate 41 in the predetermined direction. The bottom plate 41 is circular or oval in FIG. 7, and is in a fan-shaped in FIG. 8. Further, in FIG. 9, walls are provided for two sides of the bottom plate 41 in a square shape on a side of one end of the predetermined direction which corresponds to a direction of a diagonal line of the square bottom plate 41, and opening area 44 is provided for two sides of the bottom plate 41 on a side of the other end in the predetermined direction. The shape of the bottom plate 41 may be different form the shapes described above, and may be in a more complicated shape.

The oil tray 40 shown in FIG. 7, FIG. 8, and FIG. 9 is provided with a container portion for containing oil, grease, and the like, in a space enclosed by the bottom plate 41 and the wall 46. Further, in a state in which the oil tray 40 is attached to the main body 10, one end of the bottom plate 41 in the predetermined direction is at a position lower than the other end. With this, possibility that oil, grease, and the like leak from the opening area 44 is eliminated or reduced.

As the opening area 44 is provided in this manner, it is easily possible to visually confirm a condition of oil, grease, and the like within the oil tray 40. Further, the opening area 44 is provided for the periphery portion of the bottom plate 41, and the installation bolts 50 are inserted in the predetermined direction through the attachment holes 45a. Therefore, providing the opening area 44 facilitates fastening or removal of the installation bolts 50 using a tool. Moreover, in this embodiment, as the opening area 44 is provided for the bottom plate 41 so as to face outward from the main body 10, visual confirmation and handing of the tool is further facilitated.

A part or all of the oil tray 40 may be made of a plastic material. In this case, visual confirmation of the condition of oil, grease, and the like within the oil tray 40 becomes further facilitated.

It should be noted that the screw holes 14 may be provided for a surface of the motor housing 12 extending substantially vertically without using the attachment block 13. Similarly to the case described above, it is also possible in this case to attach the oil tray 40 to the main body 10 by fastening the installation bolts 50 inserted into the attachment holes 45a to the screw holes 14.

Figure 10:
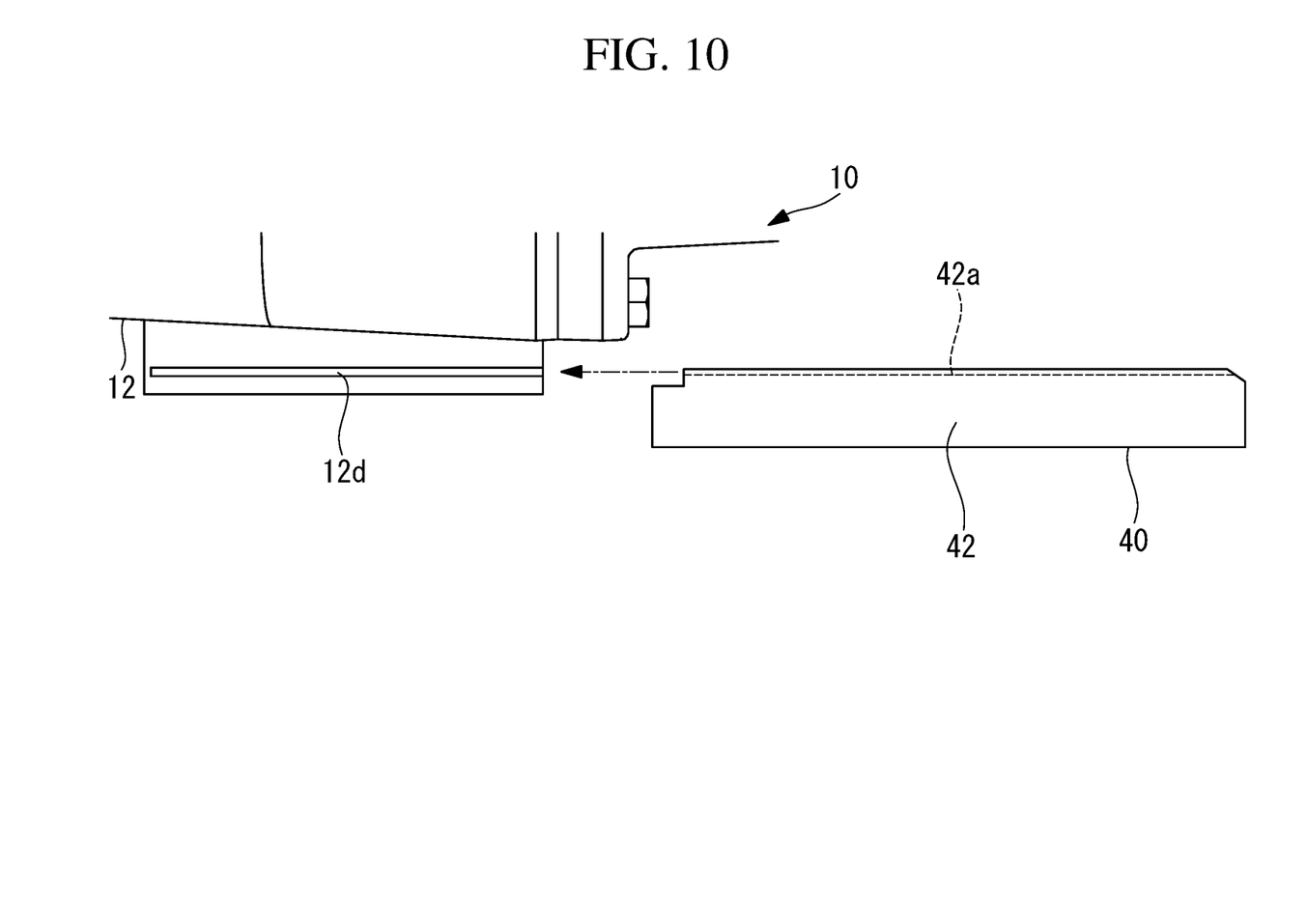
FIG. 10 is a front view of a main part of a fourth modified example of the parallel link robot according to this embodiment.

Further, as illustrated in FIG. 10, it is possible to provide grooves (first engagement portions) 12d extending along both sides of the motor housing 12 in the predetermined direction. The grooves 12d extend horizontally, or obliquely downward. In this case, the oil tray 40 is detachably attached to the motor housing 12 by engagement of the grooves 12d along the both sides with flange portions (second engagement portions) 42a provided for the oil tray 40. In FIG. 10, the flange portions 42a are respectively formed by folding portions of the side walls 42 into the oil tray 40.

It should be noted that the oil tray 40 may be attached to a portion of the lower surface of the main body 10 other than the motor housing 12. Further, the oil tray 40 may be attached to the lower surface of the main body 10 even when the main body 10 has a shape and a configuration different from those in this embodiment, and the same effect as described above may be obtained.

Figure 11:
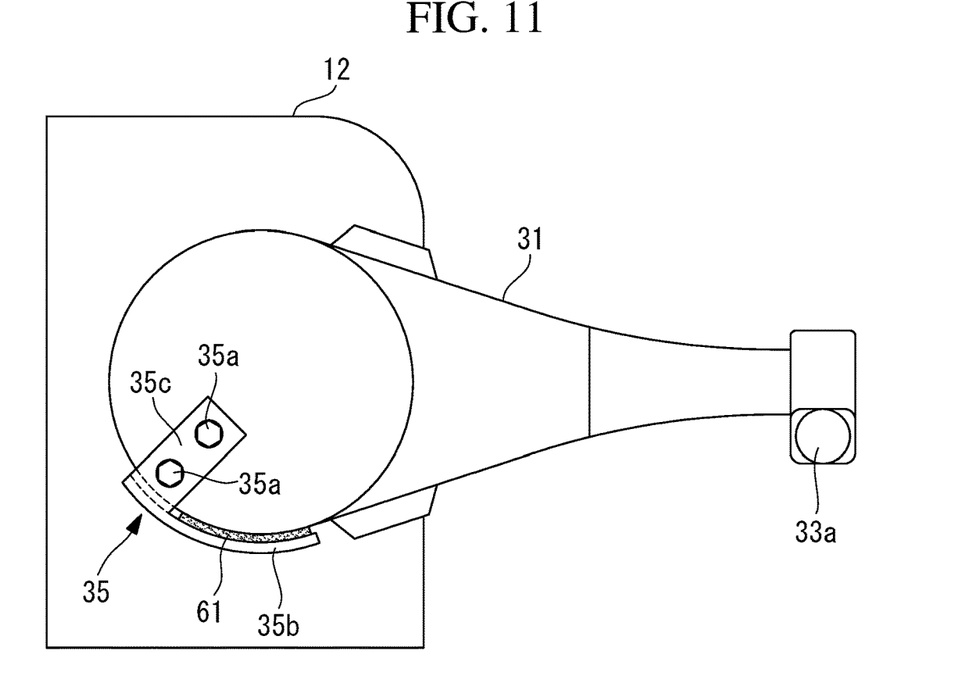
FIG. 11 is a side view of a motor housing and a drive link of a fifth modified example of the parallel link robot according to this embodiment.
Figure 12:
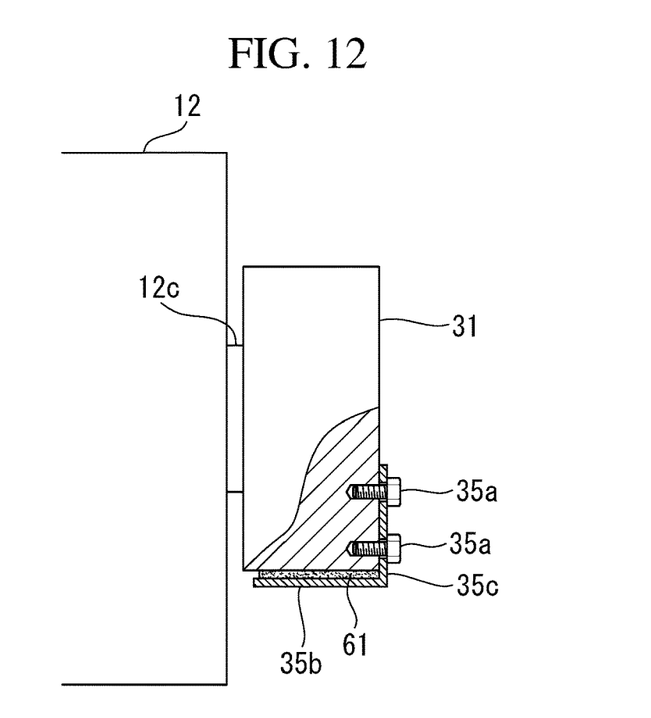
FIG. 12 is a cross-sectional view of a main part of the drive link of the fifth modified example of the parallel link robot according to this embodiment.

Moreover, it is possible to further provide a link unit oil absorbent sheet 61. For example, as illustrated in FIG. 11 and FIG. 12, the link unit oil absorbent sheet 61 covers a part of a lower surface of the drive link 31 on a base end side. Further, a part of a sheet holding member 35 is fixed to the drive link 31 on the base end side via bolts 35a. The sheet holding member 35 is typically made by flexing a metal plate, but may be formed by a plastic material.

The sheet holding member 35 includes a holding portion 35b curving along the lower surface of the drive link 31 on the base end side, and an attachment piece 35c extending from one end of the holding portion 35b in a through-thickness direction of the holding portion 35b. The attachment piece 35c is fixed to one side of the drive link 31 on the base end side via the bolts 35a. The link unit oil absorbent sheet 61 is held between the base end side of the drive link 31 and the holding portion 35b. Typically, the holding portion 35b presses the link unit oil absorbent sheet 61 against the drive link 31.

Therefore, it is possible to prevent oil, grease, and the like running down the drive link 31 from dripping on the conveyor. This configuration is advantageous in order to improve reliability and the like of quality of products that the parallel link robot handles.

The following aspects of the present invention are derived from the above disclosure.

A parallel link robot according to a first aspect of the present invention includes: a main body; a plurality of driving mechanisms provided in the main body; a plurality of link units each having one end connected to corresponding one of the plurality of driving mechanisms; a movable plate disposed beneath the main body, and supported by the other ends of the plurality of link units; and an oil tray placed adjacently to a lower surface of the main body, wherein the oil tray is detachably attached to the main body.

According to this aspect, the oil tray is disposed in the neighborhood of the lower surface of the main body, and the oil tray is detachably attached to the main body. Therefore, the oil tray can be removed when inspection, cleaning, and other types of maintenance of the main body are carried out.

In a case in which the parallel link robot handles delicate products such as food, medicinal products, and cosmetics, inspection, cleaning, and other types of maintenance of the main body largely influences quality maintenance, reliability of quality, and the like of these products. As the oil tray is removable, it is possible to easily and reliably perform inspection, cleaning, and other types of maintenance of the main body, in particular, the lower surface portion of the main body. This is advantageous in order to improve reliability and the like of quality of products that the parallel link robot handles.

In the aspect described above, preferably, the parallel link robot further includes an oil absorbent sheet covering at least a part of an upper surface of a bottom plate of the oil tray.

Therefore, oil, grease, and the like may not easily drip from the oil tray, as compared to a case in which the oil absorbent sheet is not provided. For example, if the oil tray is inclined when removing the oil tray from the main body, oil, grease, and the like may not easily drip from the oil tray as compared to the case in which the oil absorbent sheet is not provided. This is advantageous in order to improve reliability and the like of quality of products that the parallel link robot handles.

In the aspect described above, preferably, the main body includes a screw hole extending substantially horizontally, and the oil tray is detachably attached to the main body by an installation bolt screwed into the screw hole.

In a case in which the installation bolt is inserted, for example, into a screw hole extending vertically, the installation bolt may drop easily during fastening or removal of the installation bolt.

In the case in which the parallel link robot handles delicate products such as food, medicinal products, contamination and damages of the conveyor and the like due to dropping of the installation bolt often considered to be undesirable. By contrast, the installation bolt inserted into the screw hole that extends substantially horizontally may not drop easily during fastening or removal of the installation bolt.

Furthermore, as the screw hole extends substantially horizontally, the installation bolt may not drop easily even if the installation bolt is loosened, as compared to the case in which the screw hole extends vertically.

In the aspect described above, preferably, the main body includes an attachment block fixed to a lower surface portion of the main body, a fixation bolt that fixes the attachment block to the lower surface portion extends along a vertical axial line, the attachment block is provided with a screw hole extending substantially horizontally, the oil tray is detachably attached to the main body by an installation bolt screwed into the screw hole, and the oil tray is positioned under the fixation bolt.

As described above, as the oil tray is positioned under the fixation bolt, even if the fixation bolt is loosened and dropped, the dropped fixation bolt is received by the oil tray. This configuration is advantageous in order to improve reliability of quality of products that the parallel link robot handles.

In the aspect described above, preferably, the main body includes a first engagement portion that is one of a rail and a groove extending at least horizontally, the oil tray includes a second engagement portion that is one of a rail and a groove configured to engage with the first engagement portion, and the oil tray is detachably attached to the main body by engagement of the first engagement portion with the second engagement portion.

As the oil tray is also removable in this case, it is possible to easily and reliably perform inspection, cleaning, and other types of maintenance of the main body, in particular, the lower surface portion of the main body.

In the aspect described above, preferably, the oil tray includes a bottom plate, a wall extending upwardly from one end in a predetermined direction of the bottom plate, and an opening area at the other end of the oil tray in the predetermined direction, the opening area does not have a wall extending upwardly from the bottom plate, the oil tray further includes an attachment portion extending upwardly from the bottom plate at a middle position in the predetermined direction, and fixed to the main body by the installation bolt, and the attachment portion is provide with an attachment hole through which the installation bolt is inserted in the predetermined direction.

As the oil tray is provided with the opening area in this manner, it is possible to visually confirm a condition of oil, grease, and the like within the oil tray with an easy manner. Further, the opening area is provided in the other end of the bottom plate in the predetermined direction, and the installation bolt is inserted in the predetermined direction through the attachment hole. Therefore, providing the opening area facilitates fastening or removal of the installation bolts using a tool.

Further, as the oil tray is provided with the opening area, it is possible to place the oil tray near the main body. This is advantageous for reducing a space for the main body to which the oil tray is attached.

In the aspect described above, preferably, the parallel link robot further includes a link unit oil absorbent sheet that covers at least a part of the one end of the link unit.

According to this aspect, it is possible to prevent oil, grease, and the like running down the link unit from dripping down.

In the aspect described above, preferably, the parallel link robot further includes a sheet holding member detachably attached to the one end of the link unit, wherein the link unit oil absorbent sheet is pressed against the one end of the link unit by the sheet holding member.

According to this aspect, it is possible to easily and reliably attach the link unit oil absorbent sheet to the one end of the link unit. This is advantageous in order to improve reliability and the like of quality of products that the parallel link robot handles.

A parallel link robot according to a second aspect of the present invention includes: a main body; a plurality of driving mechanisms provided in the main body; a plurality of link units each having one end connected to corresponding one of the plurality of driving mechanisms; a movable plate disposed beneath the main body, and supported by the other ends of the plurality of link units; and an oil tray attached adjacent to a lower surface of the main body, wherein the oil tray includes a bottom plate, a wall extending upwardly from one end of the bottom plate in a predetermined direction, and an opening area at the other end of the oil tray in the predetermined direction, the opening area does not have a wall extending upwardly from the bottom plate.

As the oil tray is provided with the opening area in this manner, it is easily possible to visually confirm a condition of oil, grease, and the like within the oil tray. Further, the opening area is provided for the other end of the bottom plate in the predetermined direction, and the installation bolt is inserted in the predetermined direction through the attachment hole. Therefore, providing the opening area facilitates fastening or removal of the installation bolts using a tool.

Further, as the oil tray is provided with the opening area, it is possible to place the oil tray near the main body. This is advantageous for reducing a space for the main body to which the oil tray is attached.

In the second aspect, preferably, the one end of the bottom plate of the oil tray in the predetermined direction is located at a position lower than the other end of the bottom plate.

With this configuration, possibility that oil, grease, and the like leak from the opening area is eliminated or reduced. This is advantageous in order to improve reliability of quality of products that are handled.

According to the above aspects, it is possible to improve reliability of quality of products that are handled.

REFERENCE SIGNS LIST

10 Main body
11 Base member
12 Motor housing
12d Groove (first engagement portion)
13 Attachment block
13a Attachment surface
14 Screw hole
14a Central axis line
20 Movable plate
30 Link unit
31 Drive link
32 Driven link
33, 34 Spherical bearings
33a Spherical coupling portion
35 Sheet holding member
35b Holding portion
35c Attachment piece
40 Oil tray
41 Bottom plate
41a Upper surface
42 Side wall
42a Flange portion (second engagement portion)
43 Back wall
44 Opening area
45 Attachment portion
45a Attachment hole
50 Installation bolt
60 Oil absorbent sheet
61 Link unit oil absorbent sheet

The invention claimed is:

1. A parallel link robot comprising:
a main body;
a plurality of driving mechanisms provided in the main body;
a plurality of link units each having one end connected to a corresponding one of the plurality of driving mechanisms;
a movable plate disposed beneath the main body, and supported by other ends of the plurality of link units; and
an oil tray placed adjacently to a lower surface of the main body, wherein the oil tray is detachably attached to the main body, and includes a bottom plate and a wall, the bottom plate is flat and planar, has one end in a predetermined direction that is orthogonal to a thickness direction of the bottom plate, the wall extends upwardly from the one end of the bottom plate, further includes an attachment portion extending upwardly from the bottom plate at a position in the predetermined direction that is not on the periphery of the oil tray, and the attachment portion is provided with an attachment hole, and is attached to the main body by an installation bolt which is inserted into the attachment hole.

2. The parallel link robot according to claim 1, further comprising:
an oil absorbent sheet covering at least a part of an upper surface of the bottom plate of the oil tray.

3. The parallel link robot according to claim 1, wherein the main body includes a screw hole extending substantially horizontally, and the oil tray is detachably attached to the main body by the installation bolt screwed into the screw hole.

4. The parallel link robot according to claim 3, wherein the oil tray includes an opening area at an opposite end of the bottom plate and the opening area does not have a wall extending upwardly from the bottom plate.

5. The parallel link robot according to claim 1, wherein the main body includes:
an attachment block fixed to a lower surface portion of the main body, and
a fixation bolt that is configured to fix the attachment block to the lower surface portion extending along a vertical axial line, wherein the attachment block is provided with a screw hole extending substantially horizontally, the oil tray is detachably attached to the main body by the installation bolt screwed into the screw hole, and the oil tray is positioned under the fixation bolt.

6. The parallel link robot according to claim 1, further comprising:
a link unit oil absorbent sheet that covers at least a part of the one end of the link unit.

7. The parallel link robot according to claim 6, further comprising:
a sheet holding member detachably attached to the one end of the link unit, wherein the link unit oil absorbent sheet is pressed against the one end of the link unit by the sheet holding member.

8. A parallel link robot comprising:
a main body;
a plurality of driving mechanisms provided in the main body;

a plurality of link units each having one end connected to a corresponding one of the plurality of driving mechanisms;

a movable plate disposed beneath the main body, and supported by other ends of the plurality of link units; and an oil tray attached adjacently to a lower surface of the main body, wherein the oil tray includes a bottom plate that is flat and planar, has one end in a predetermined direction that is orthogonal to a thickness direction of the bottom plate, a wall that extends upwardly from the one end of the bottom plate, and an opening area at an opposite end that does not have a wall extending upwardly from the bottom plate, further includes an attachment portion extending upwardly from the bottom plate at a position in the predetermined direction that is not on the periphery of the oil tray, and the attachment portion is provided with an attachment hole, and is attached to the main body by an installation bolt which is inserted into the attachment hole.

9. The parallel link robot according to claim 8, wherein the one end of the bottom plate of the oil tray in the predetermined direction is located at a position lower than the opposite end of the bottom plate.

* * * * *